(12) United States Patent
Kim

(10) Patent No.: US 11,020,890 B2
(45) Date of Patent: *Jun. 1, 2021

(54) METHOD FOR PRODUCING PACKING SHEET WITH IMPROVED INSULATION AND STORAGE PROPERTIES

(71) Applicants: Ho Chil Kim, Iksan-si (KR); SEGYERO CO., LTD., Gimje-si (KR)

(72) Inventor: Ho Chil Kim, Iksan-si (KR)

(73) Assignees: Ho Chil Kim, Iksan-si (KR); SEGYERO CO., LTD., Gimje-si (KR)

( * ) Notice: Subject to any disclaimer, the term of this patent is extended or adjusted under 35 U.S.C. 154(b) by 277 days.

This patent is subject to a terminal disclaimer.

(21) Appl. No.: 16/332,706

(22) PCT Filed: Aug. 30, 2017

(86) PCT No.: PCT/KR2017/009467
§ 371 (c)(1),
(2) Date: Mar. 12, 2019

(87) PCT Pub. No.: WO2018/052205
PCT Pub. Date: Mar. 22, 2018

(65) Prior Publication Data
US 2019/0218014 A1    Jul. 18, 2019

(30) Foreign Application Priority Data

Sep. 13, 2016  (KR) .................. 10-2016-0117722

(51) Int. Cl.
*B29C 48/00* (2019.01)
*B29C 53/18* (2006.01)
*B65D 81/03* (2006.01)
*B65D 65/40* (2006.01)
*B65D 81/05* (2006.01)
(Continued)

(52) U.S. Cl.
CPC ........ *B29C 48/0022* (2019.02); *B29C 43/226* (2013.01); *B29C 48/0017* (2019.02); *B29C 48/08* (2019.02); *B29C 51/02* (2013.01); *B29C 51/10* (2013.01); *B29C 53/18* (2013.01); *B29C 66/438* (2013.01); *B29C 66/72521* (2013.01); *B32B 38/0004* (2013.01); *B65D 65/40* (2013.01); *B65D 81/03* (2013.01); *B65D 81/052* (2013.01); *B65D 81/38* (2013.01); *B65D 81/3888* (2013.01); *B29C 49/0015* (2013.01); *B29C 2793/009* (2013.01); *B29K 2101/12* (2013.01); *B29L 2031/7138* (2013.01); *B32B 2553/026* (2013.01)

(58) Field of Classification Search
CPC .......... B29C 2793/009; B29C 48/0022; B29C 66/438; B29C 66/72521; B29C 53/18; B29C 43/224; B29C 43/226; B29C 49/0015; B65D 81/03; B65D 81/052; B32B 2553/026; B32B 38/0004
See application file for complete search history.

(56) References Cited

FOREIGN PATENT DOCUMENTS

JP      01-103570 U    7/1989
JP      2002-542125 A  12/2002
(Continued)

*Primary Examiner* — Atul P. Khare
(74) *Attorney, Agent, or Firm* — Novick, Kim & Lee, PLLC; Jae Youn Kim

(57) ABSTRACT

Provided is a method for producing a packing sheet with improved insulation and storage properties, which can greatly reduce logistics costs by minimizing a volume during storage and transportation and also greatly increase insulation.

14 Claims, 22 Drawing Sheets

(51) Int. Cl.
*B65D 81/38* (2006.01)
*B29C 65/00* (2006.01)
*B32B 38/00* (2006.01)
*B29C 43/22* (2006.01)
*B29C 48/08* (2019.01)
*B29C 51/02* (2006.01)
*B29C 51/10* (2006.01)
B29C 49/00 (2006.01)
B29K 101/12 (2006.01)
B29L 31/00 (2006.01)

(56) References Cited

FOREIGN PATENT DOCUMENTS

| | | |
|---|---|---|
| JP | 2003-175944 A | 6/2003 |
| JP | 2004-249605 A | 9/2004 |
| JP | 2005-059559 A | 3/2005 |
| JP | 2012-162045 A | 8/2012 |
| JP | 2012-179875 A | 9/2012 |
| JP | 2013-124138 A | 6/2013 |
| JP | 2016-159959 A | 9/2016 |
| KR | 10-0995179 B1 | 11/2010 |
| KR | 10-2011-0004091 A | 1/2011 |
| KR | 10-2013-0018355 A | 2/2013 |
| KR | 10-1351072 B1 | 1/2014 |
| KR | 10-1482311 B1 | 1/2015 |
| KR | 10-1500879 B1 | 3/2015 |
| WO | 95/018008 A1 | 7/1995 |
| WO | 2004/048077 A1 | 6/2004 |

METHOD FOR PRODUCING PACKING SHEET WITH IMPROVED INSULATION AND STORAGE PROPERTIES

TECHNICAL FIELD

The present invention relates generally to a packing sheet and, more particularly, to a method for producing a packing sheet with greatly improved insulation and storage properties.

BACKGROUND ART

In general, packing materials are used not only to enhance the appearance of packed goods, but also to protect the packed goods against external impacts. In particular, in packing of electrical and electronic products or automobile parts such as, bumpers, fenders, doors, and the like, a first foaming paper sheet or an air cap wrapping sheet is generally used to separate the electrical and electronic parts and the automobile parts from an inner surface of a box wall inside of a paper box such that an impact force which may be externally applied to packed goods is absorbed and alleviated.

In the case of the air cap wrapping sheet, there is a problem in that the volume of air caps is inevitably large due to the air caps sealed in units of cells, causing an excessive increase in logistics costs such as transportation costs.

Meanwhile, in an effort to solve such a problem of the air cap wrapping sheet in the related art, Patent Documents 1 to 3 and the like have been proposed.

Patent Document 1 (Korean Patent No. 10-1482311) relates to a packing bag with a cushioning function, which includes a first cushioning air column part composed of multiple air columns, a second cushioning air column part composed of multiple air columns and connected to the first cushioning air column part to form an accommodation space for accommodating goods, and a tie connected to the first cushioning air column part and/or connected to the second cushioning air column part to close an entrance of the accommodation space.

Furthermore, Patent Document 2 (Korean Patent No. 10-1351072) relates to a package equipped with a double air bag and a packaging method thereof, the package including an inner cushioning part composed of a pair of backing sheets coupled to each other, the inner cushioning part in which air is filled and forming an accommodating portion for accommodating a packaging object; an outer cushioning part surrounding the inner cushioning part and in which air is filled; and an air injection part to which air is injected through an air inlet, wherein the air injection part is configured to communicate with the inner and outer cushioning parts via both an air filling inlet of the inner cushioning part and an air filling inlet of the outer cushioning part, whereby air filling of the inner and outer cushioning parts is completed by only one air injection through the air injection part.

Patent Document 3 (Korean Patent No. 10-0995179) relates to a bendable multi-sectional cushioning cover bag including a packaging box, a first air tube, a second air tube, and a light-reflecting sheet. Herein, an end of the second air tube is connected to the first air tube and communicates therewith. Furthermore, multiple first cushioning parts provided at the first air tube and multiple second cushioning parts provided at the second air tube correspond to each other, and each of the second cushioning parts and each of the first cushioning parts corresponding thereto are adhered together by means of heat sealing at respective three sides thereof, thus forming an accommodation space in which goods are mounted.

The packing bag, the package, and the cover bag disclosed in Patent Documents 1 to 3 can be transported and stored and in a state of not injecting air and thus are significantly reduced in volume as compared with the air cap packing sheet in the related art, resulting in a significant reduction in logistics costs such as transportation costs. In addition, air can be injected before use to realize a cushioning function, thus safely packing goods. Meanwhile, a predetermined insulation property is provided by air cells into which air is injected. However, the air cells are welded together, which may cause a problem in that heat exchange is increased by welded portions, resulting in a significant reduction in insulation.

DISCLOSURE

Technical Problem

Accordingly, the present invention has been made keeping in mind the above problems occurring in the related art, and an objective of the present invention is to provide a method for producing a packing sheet with improved insulation and storage properties, wherein logistics costs are greatly reduced by minimizing a volume during storage and transportation, while greatly increasing insulation.

Technical Solution

In order to accomplish the above objective, the present invention provides a method for producing a packing sheet with improved insulation and storage properties, the method including:

producing a cap packing sheet comprised of a formed film on which convex ridges are formed at a regular interval in a direction from a front side to a rear side thereof, a lower film having auxiliary check valves provided at a side of an upper surface thereof at a regular interval and attached to a lower side of the formed film in a state in which each of the auxiliary check valves is disposed in an opening of each of the ridges of the formed film, thus sealing the ridges of the formed film, and an upper film attached onto the sealed ridges of the formed film;

cutting the cap packing sheet along a second edge thereof such that second ends of the sealed ridges of the cap packing sheet are opened; and sealing a second end of the cap packing sheet after a fluid in the sealed ridges of the cap packing sheet is removed.

In particular, a first end of the lower film and a first end of the upper film may be extended longer than a first end of the formed film in a first side direction, and a common check valve may be provided on an upper surface of the first end of the lower film or on a lower surface of the first end of the upper film.

Furthermore, the common check valve may comprise multiple common check valves that are provided on the upper surface of the first end of the lower film or on the lower surface of the first end of the upper film such that an interval between the common check valves is longer than an interval between the auxiliary check valves.

The method may further comprise forming a common injection space that is in communication with the auxiliary check valves by sealing the first end of the lower film and the first end of the upper film, except for an injection hole of the common check valve.

Furthermore, the formed film may be produced by melt-extruding a thermoplastic synthetic resin onto a vacuum forming roller having forming grooves that are formed in an outer circumferential surface thereof at a regular interval and have a shape corresponding to the ridges.

Furthermore, the formed film may be produced by forming a thermoplastic synthetic resin film by using a thermoforming roller having forming protrusions that are formed at a regular interval and have a shape corresponding to the ridges.

Furthermore, lower films, upper films, and formed films may be attached together in a state in which the lower films and the upper films are alternately stacked on top of each other with the formed films each interposed between the lower films and the upper films, and the auxiliary check valves may be provided at a side of an upper surface of each of the upper films interposed between the formed films.

Herein, a first end of each of the lower and upper films may be extended longer than a first end of each of the formed films in a first side direction, and a common check valve may be provided on an upper surface of the first end of each of the lower films or on a lower surface of the first end of each of the upper films.

Furthermore, gas may be filled in the ridges of the formed films.

Herein, the gas may be air or an inert gas.

Alternatively, a liquid may be filled in the ridges of the formed film.

Herein, the liquid may be water.

Furthermore, a light reflection layer may be provided on an upper side of the upper film or on a lower side of the lower film, or the light reflection layer may be provided both on the upper side of the upper film and on the lower side of the lower film.

Alternatively, a cover layer may be provided on an upper side of the upper film or on a lower side of the lower film, or the light reflection layer may be provided both on the upper side of the upper film and on the lower side of the lower film.

Advantageous Effects

A packing sheet produced by a method for producing a packing sheet with improved insulation and storage properties according to the present invention can be transported and stored in a state in which air in ridges is removed, that is, the volume of the packing sheet is minimized, resulting in a significant reduction in logistics costs. Furthermore, when air is injected in to the ridges through multiple common check valves, adjacent ones of the ridges are closed with an upper film attached, making it possible to greatly increase cushioning and insulation of the packing sheet.

BEST MODE

Hereinafter, exemplary embodiments of the present invention will be described in further detail with reference to the accompanying drawings. It will be understood by those of ordinary skill in the art that various changes and modifications may be made therein without departing from the technical idea and scope of the present invention and such changes and modifications belong to the claims of the present invention.

Figure 1:
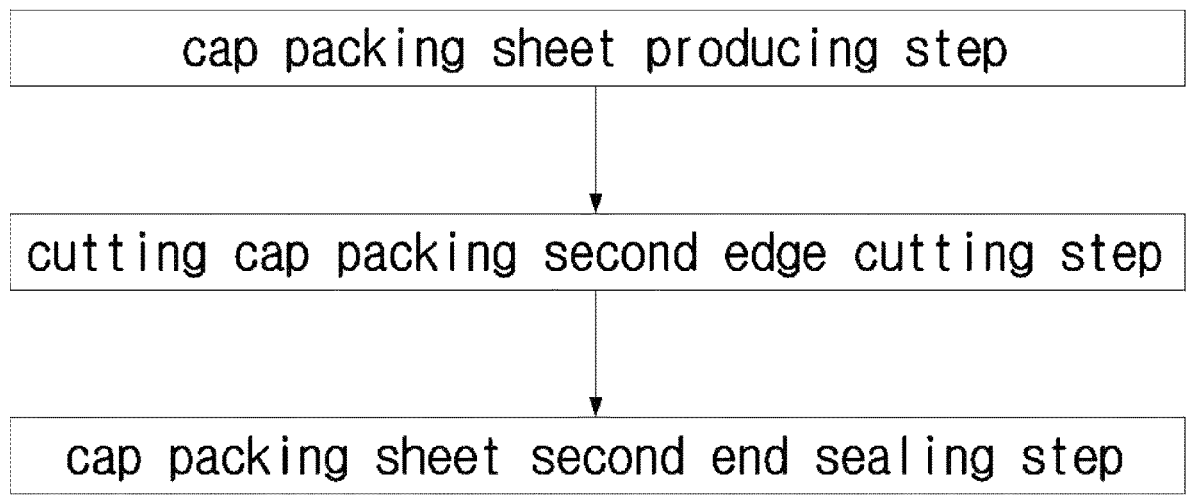
FIG. 1 is a flowchart schematically showing a method for producing a packing sheet with improved insulation and storage properties according to a first embodiment of the present invention.

FIG. 1 is a flowchart schematically showing a method for producing a packing sheet with improved insulation and storage properties according to a first embodiment of the present invention.

As shown in FIG. 1, the method for producing the packing sheet with improved insulation and storage properties largely includes a) a cap packing sheet producing step (hereinafter referred to as 'step a)'), b) a cap packing sheet second edge cutting step (hereinafter referred to as 'step b)'), and c) a cap packing sheet second end sealing step (hereinafter referred to as 'step c)').

Figure 2:
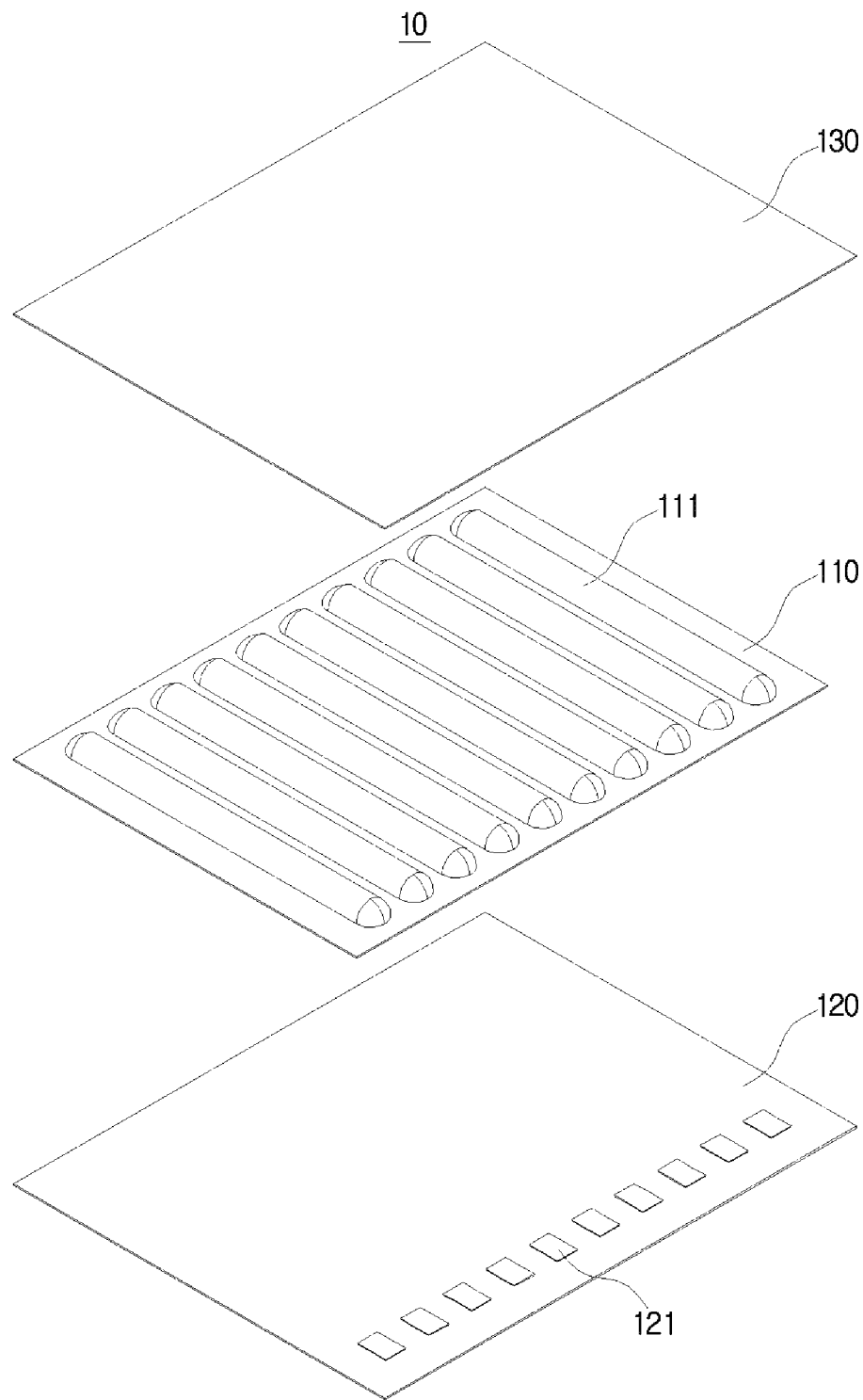
FIG. 2 is an exploded perspective view schematically showing a state in which a formed film, a lower film and an upper film of a cap packing sheet are separated.
Figure 3:
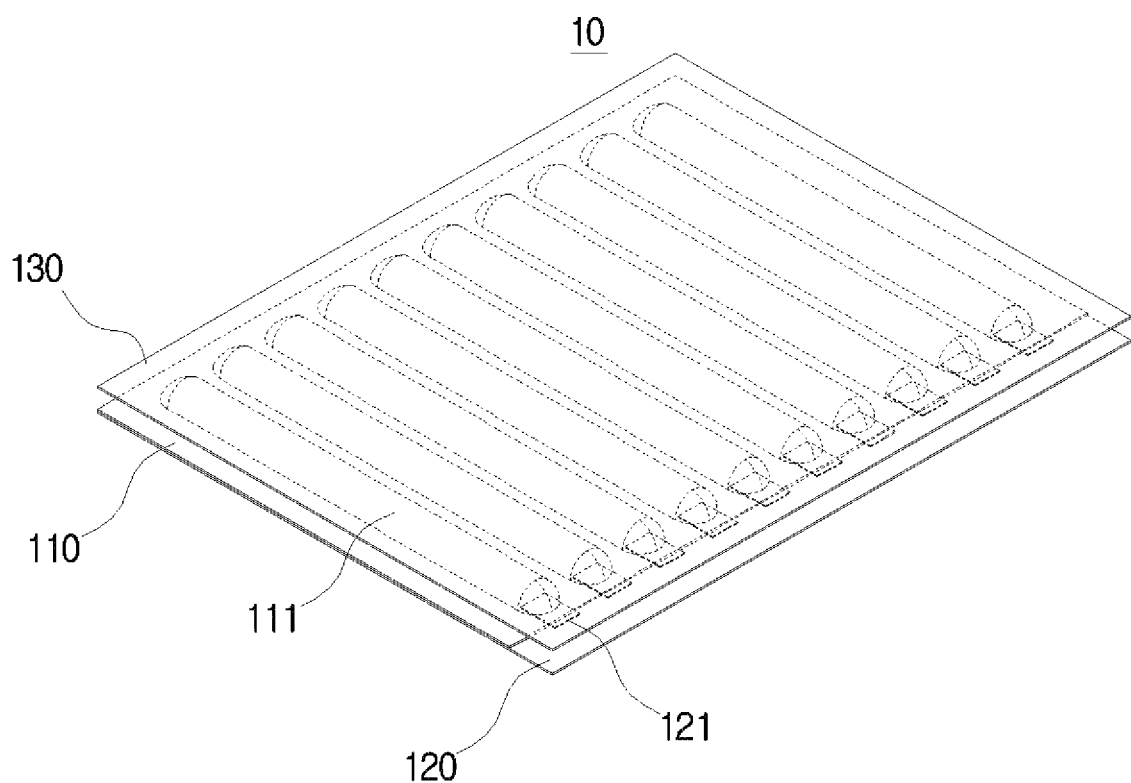
FIG. 3 is an assembled perspective view of FIG. 2.
Figure 4:
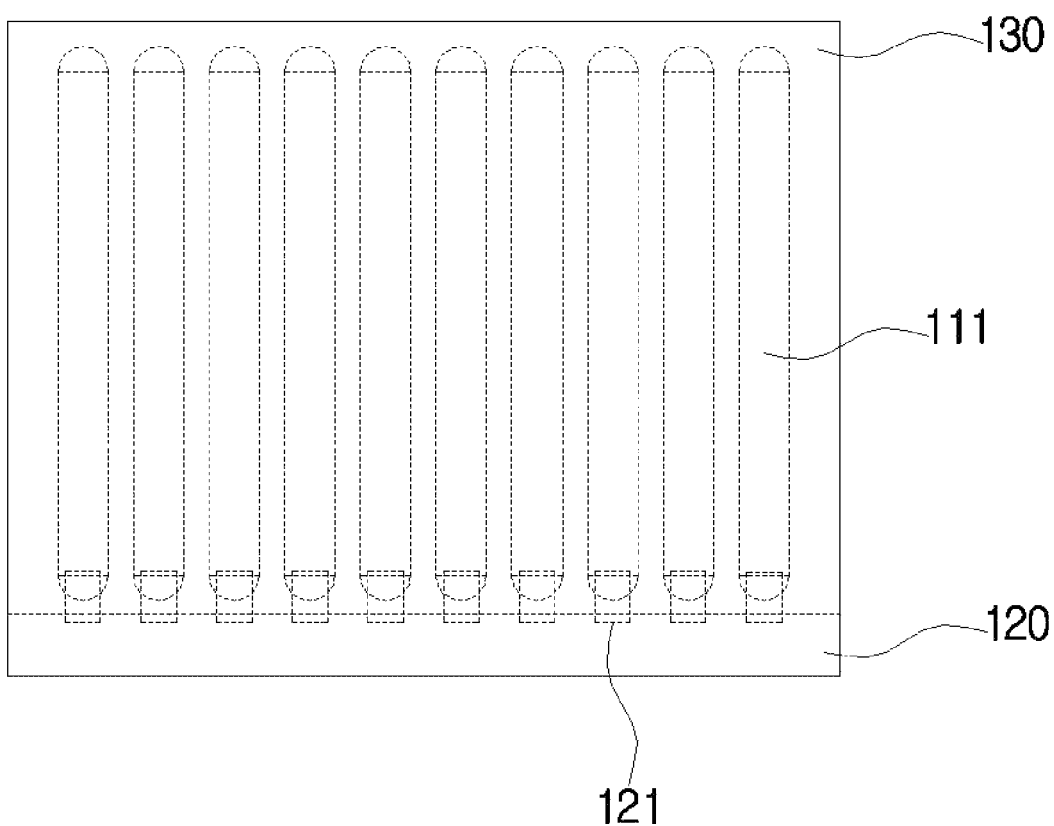
FIG. 4 is a plan view of FIG. 3.

FIG. 2 is an exploded perspective view schematically showing a state in which a formed film, a lower film and an upper film of a cap packing sheet are separated, FIG. 3 is an assembled perspective view of FIG. 2, and FIG. 4 is a plan view of FIG. 3.

First, as shown in FIGS. 2 to 4, the step a) is a step of producing the cap packing sheet 10 comprised of the formed film, the lower film 120, and the upper film 130.

The formed film 110 has ridges 111 convex upwardly of the formed film 110 and formed at a regular interval in a direction from a front side of the formed film 110 to a rear side thereof.

Each of the ridges 111 has an opening 112 (see FIG. 7) formed at a lower side thereof.

Auxiliary check valves 121 are provided at a side of an upper surface of the lower film 120 at a regular interval in a direction from a front side of the lower film 120 to a rear side thereof.

The lower film 120 is attached to a lower side of the formed film 110 by various methods such as adhering, welding, or the like in a state in which each of the auxiliary check valves 121 is disposed in the opening 112 of each of the ridges 111 of the formed film 110, whereby the openings 112 formed at the lower sides of the ridges 111 of the formed film 110 are sealed.

The upper film 130 is attached to the sealed ridges 111 of the formed film 110 by various method such as adhering.

In particular, because the ridges 111 are in a state of being convexly inflated upwardly of the formed film 110 due to a fluid such as air that is initially filled in the ridges 111 in the process of attaching the lower film 120 to the lower side of the formed film 110, it is possible to easily join the upper film 130 to the ridges 111 of the formed film 110.

Figure 5:
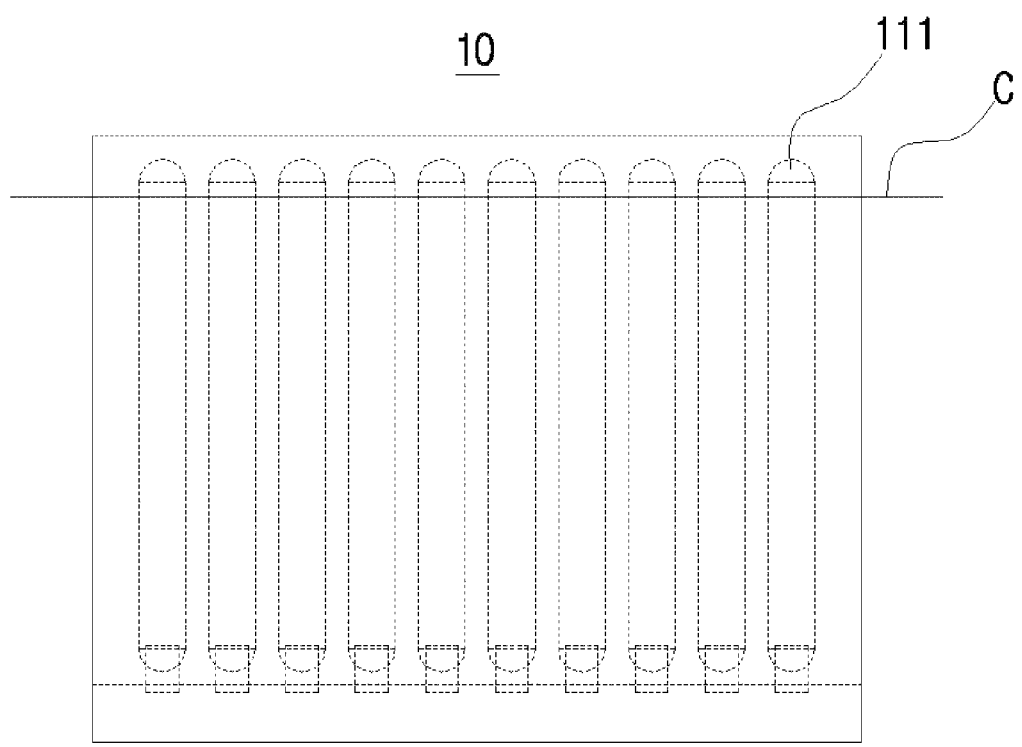
FIGS. 5 and 6 are plan views schematically showing a process of cutting the cap packing sheet along a second edge thereof.
Figure 6:
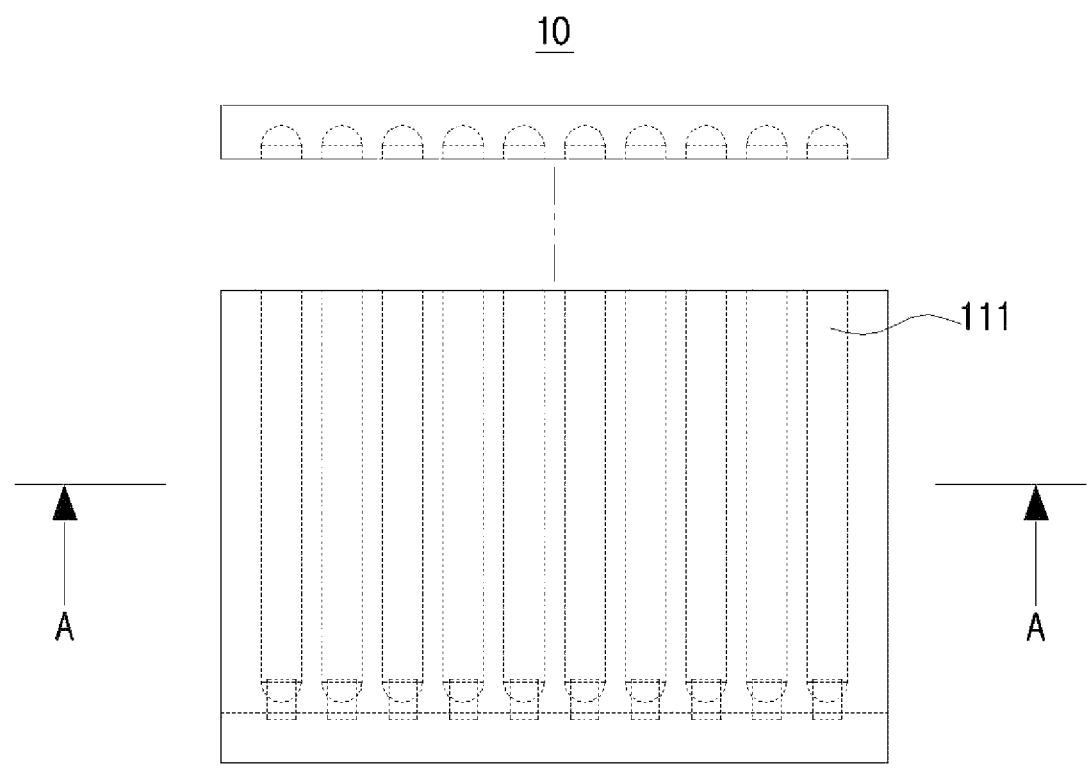

FIGS. 5 and 6 are plan views schematically showing a process of cutting the cap packing sheet along a second edge thereof.

Next, the step b) is a step of cutting (refer to C in FIG. 5) the cap packing sheet 10 is cut along the second edge thereof by using a cutting tool such as a cutter knife as shown in FIGS. 5 and 6, such that second ends of the sealed ridges 111 of the cap packing sheet 10 are opened. This is to remove the fluid such as air in the ridges 111 of the cap packing sheet 10 to outside of the ridges 111.

Figure 7:
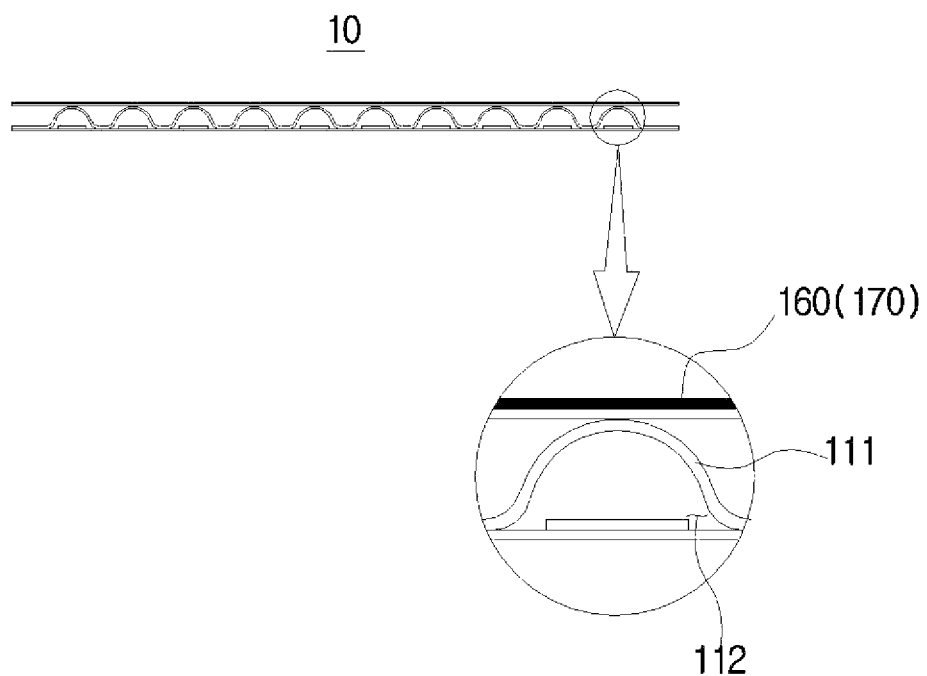
FIG. 7 is a cross-sectional view taken along line A-A of FIG. 6.
Figure 8:
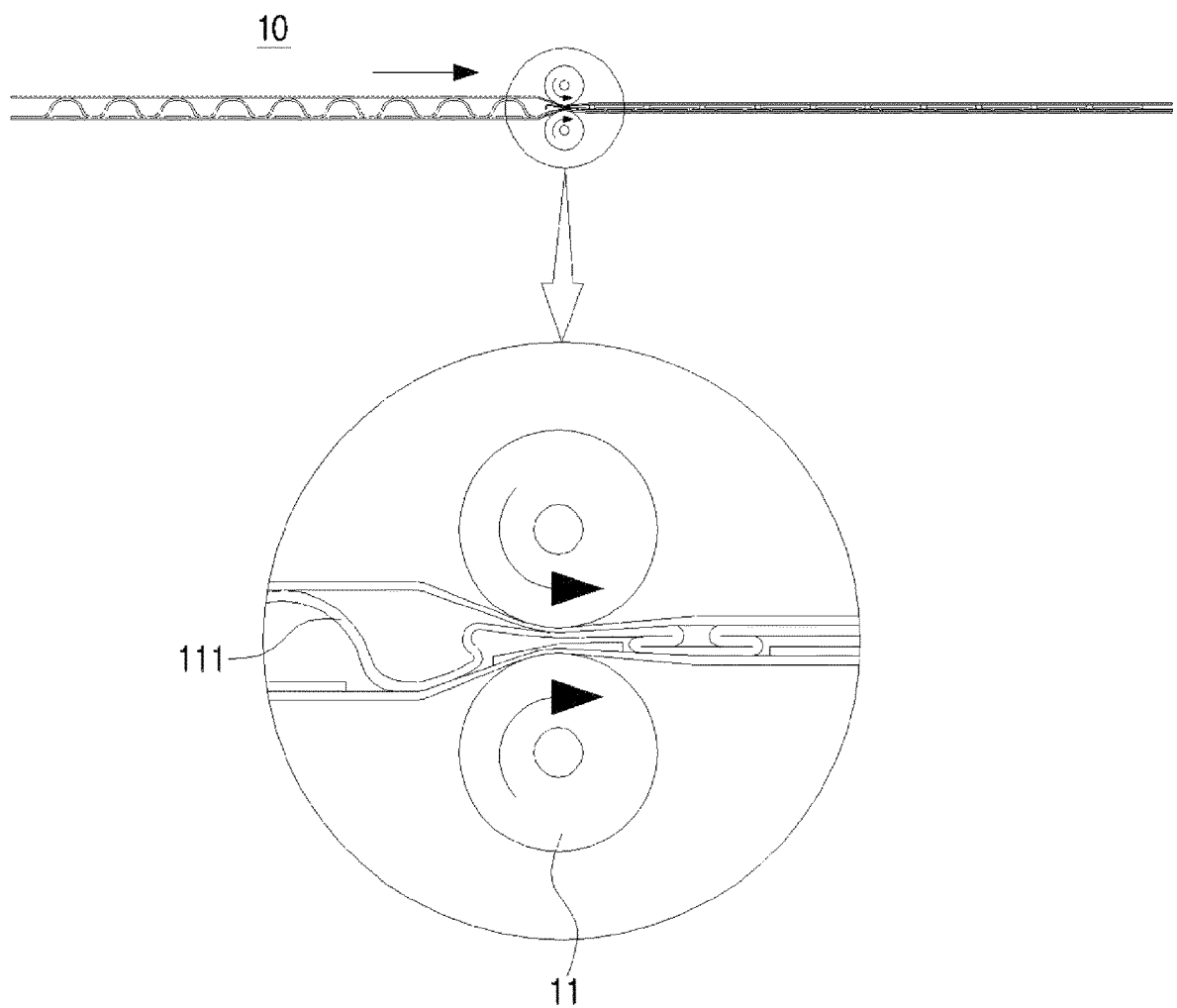
FIG. 8 is a cross-sectional view schematically showing a process of compressing the cap packing sheet.
Figure 9:
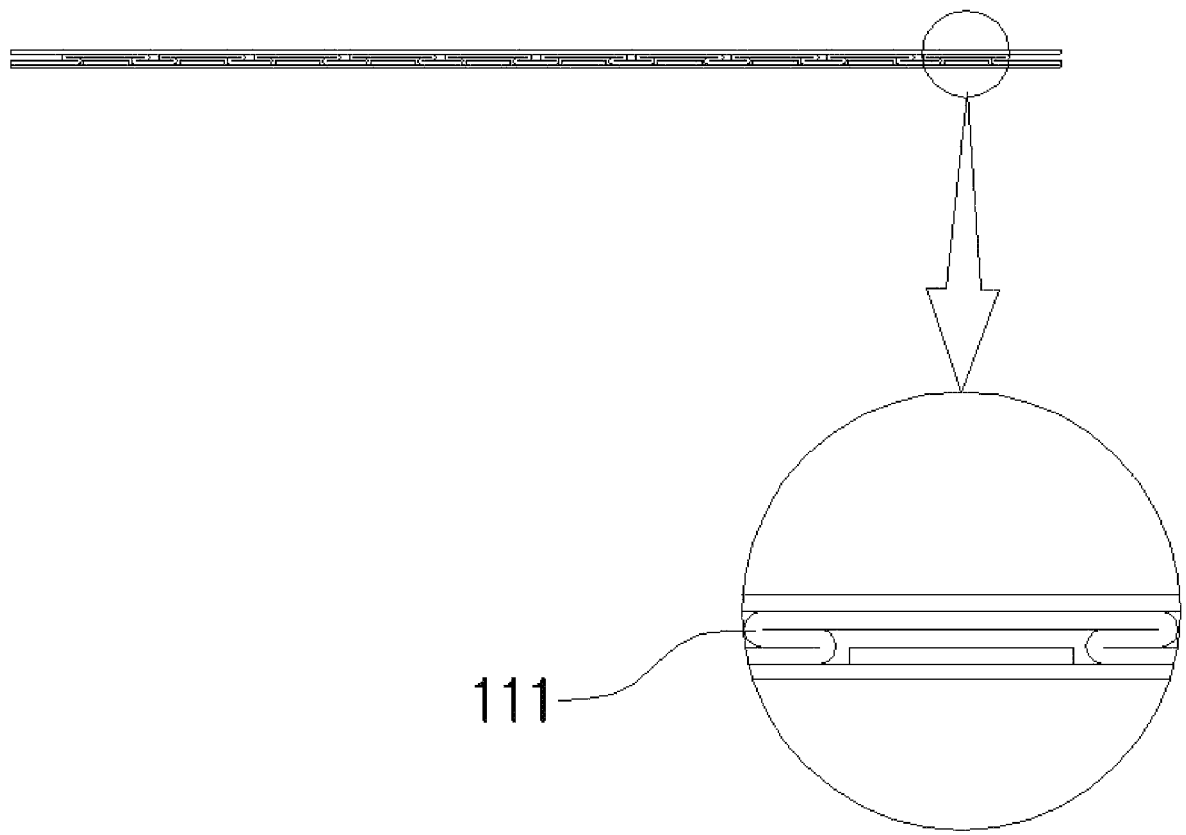
FIG. 9 is a cross-sectional view schematically showing the compressed cap packing sheet.

FIG. 7 is a cross-sectional view taken along line A-A of FIG. 6, FIG. 8 is a cross-sectional view schematically showing a process of compressing the cap packing sheet, and FIG. 9 is a cross-sectional view schematically showing the compressed cap packing sheet.

Next, the step c) is a step of sealing a second end of the cap packing sheet 10 after the fluid such as air in the ridges 111 of the cap packing sheet 10 is removed.

As shown in FIGS. 7 and 9, for example, when the cap packing sheet 10 which has been cut along the second edge is passed between a pair of rotary rollers 11, the fluid such as air in the ridges 111 of the cap packing sheet 10 is removed to outside of the second end of the cap packing sheet 10 while the cap packing sheet 10 is compressed.

Figure 10:
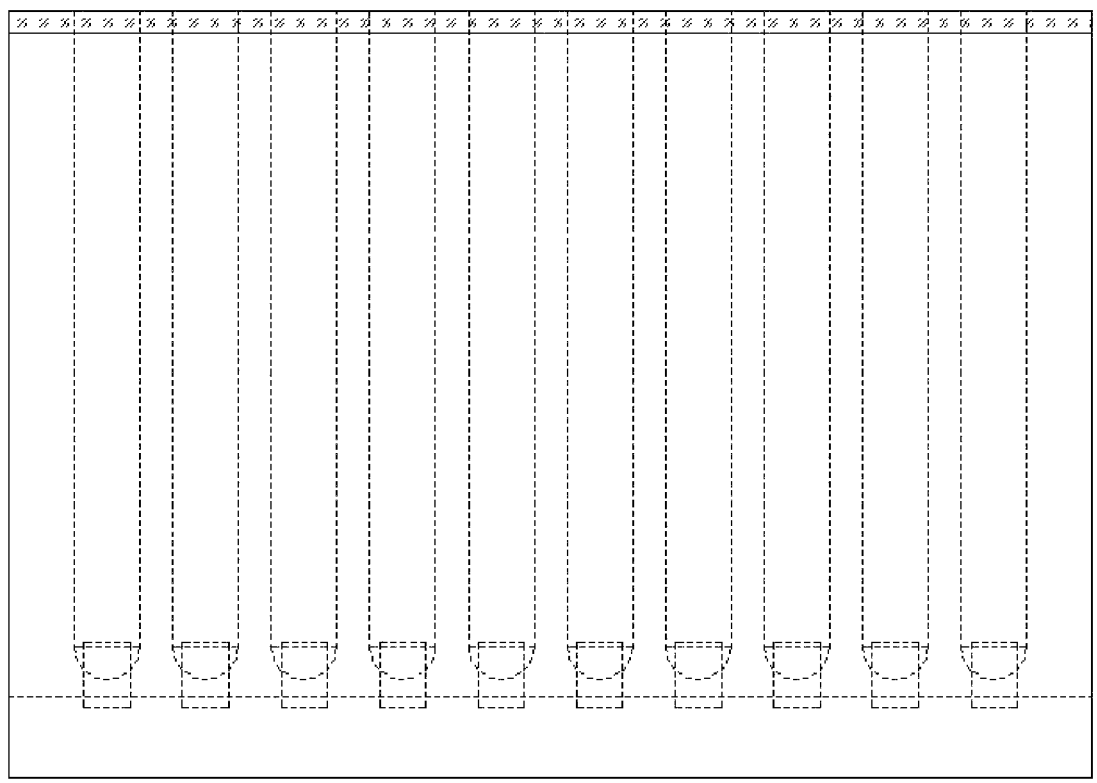
FIG. 10 is a plan view schematically showing a state in which a second end of the cap packing sheet is sealed.

FIG. 10 is a plan view schematically showing a state in which the second end of the cap packing sheet is sealed.

In this state, as shown in FIG. 10, the second end of the cap packing sheet 10 is sealed by various methods such as adhering, welding, or the like.

Figure 11:
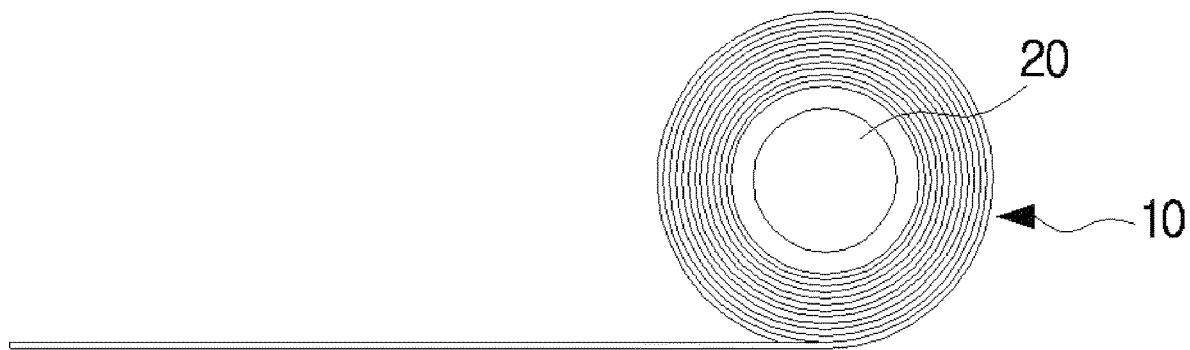
FIG. 11 is a side view schematically showing a state in which the compressed cap packing sheet is wound on a winding roller.

FIG. 11 is a side view schematically showing a state in which the compressed cap packing sheet is wound on a winding roller.

Next, there is further included a winding step (hereinafter referred to as 'step d)') of winding on an outer surface of the winding roller 20 in a roll type the cap packing sheet 10 in which the second end thereof is not sealed or the cap packing sheet 10 in which the second end thereof is sealed.

Through the step d), air in the ridges 111 is removed. This makes it possible for the cap packing sheet 10 to be transported and stored in a state in which the volume of the cap packing sheet 10 is minimized, resulting in a significant reduction in logistics costs.

Next, as shown in FIGS. 2, 3, and 9, a first end of the lower film 120 is extended longer than a first end of the formed film 110 in a first side direction of the lower film 120 such that the lower film 120 is longer in left and right length than the formed film 110.

Furthermore, a first end of the upper film 130 is extended longer than the first end of the formed film 110 in a first side direction of the upper film 130 such that the upper film 130 is longer in left and right length than the formed film 110.

Figure 12:
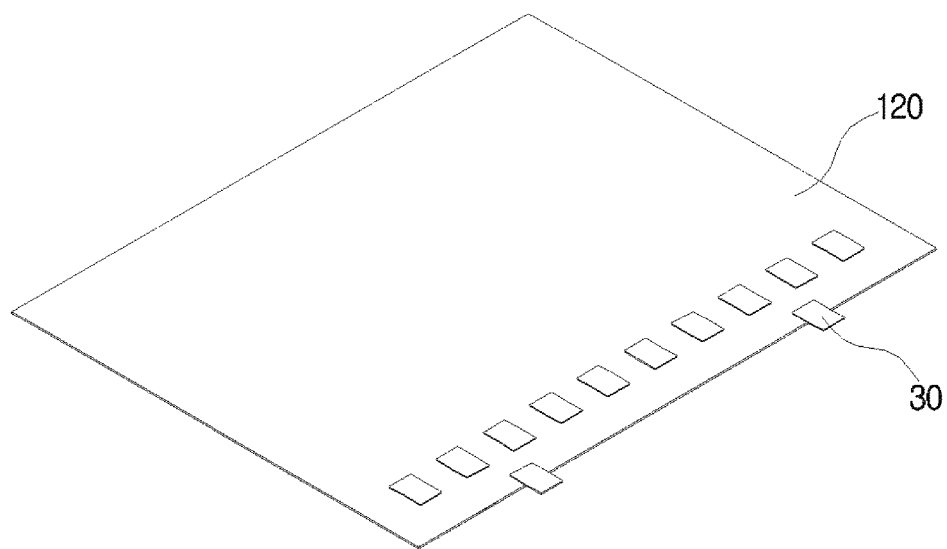
FIG. 12 is a perspective view schematically showing a state in which a common check valve is provided on an upper surface of a first end of the lower film.
Figure 13:
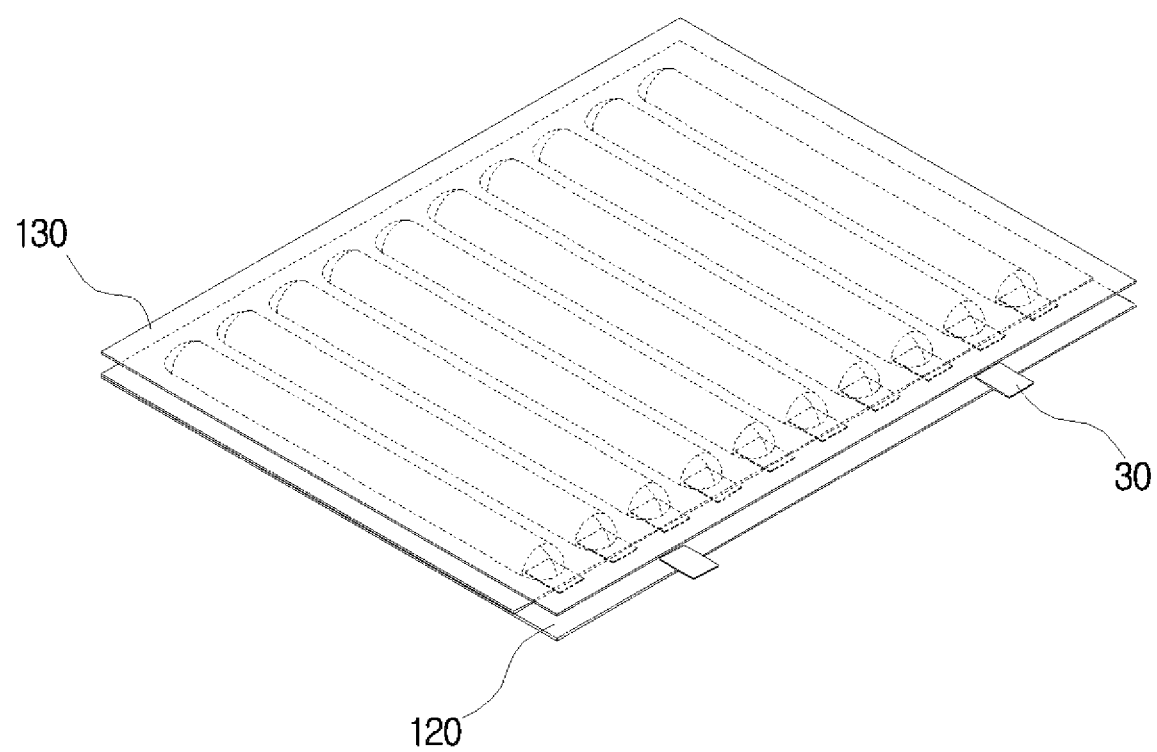
FIG. 13 is a perspective view schematically showing a state in which the formed film and the upper film are sequentially provided on the lower film provided with the common check valve.

FIG. 12 is a perspective view schematically showing a state in which a common check valve is provided on an upper surface of a first end of the lower film, and FIG. 13 is a perspective view schematically showing a state in which the formed film and the upper film are sequentially provided on the lower film provided with the common check valve.

Furthermore, as shown in FIGS. 12 and 13, a common check valve 30 is provided on an upper surface of the first end of the lower film 120 or on a lower surface of the first end of the upper film 130.

One common check valve 30 may be provided on the upper surface of the first end of the lower film 120 or on the lower surface of the first end of the upper film 130. However, in order to allow air to be injected again into the ridges 111 of the cap packing sheet 10 and a space 140 (see FIG. 7) formed between each of the ridges 111, as shown in FIG. 6, it is preferable that at least two multiple common check valves 30 are provided at a regular interval on the upper surface of the first end of the lower film 120 or on the lower surface of the first end of the upper film 130.

As shown in FIG. 12, the multiple common check valves 30 are provided on the upper surface of the first end of the lower film 120 or on the lower surface of the first end of the upper film 130 such that an interval between the common check valves 30 in a front-to-rear direction is longer than an interval between the auxiliary check valves 121 in the front-to-rear direction.

Figure 14:
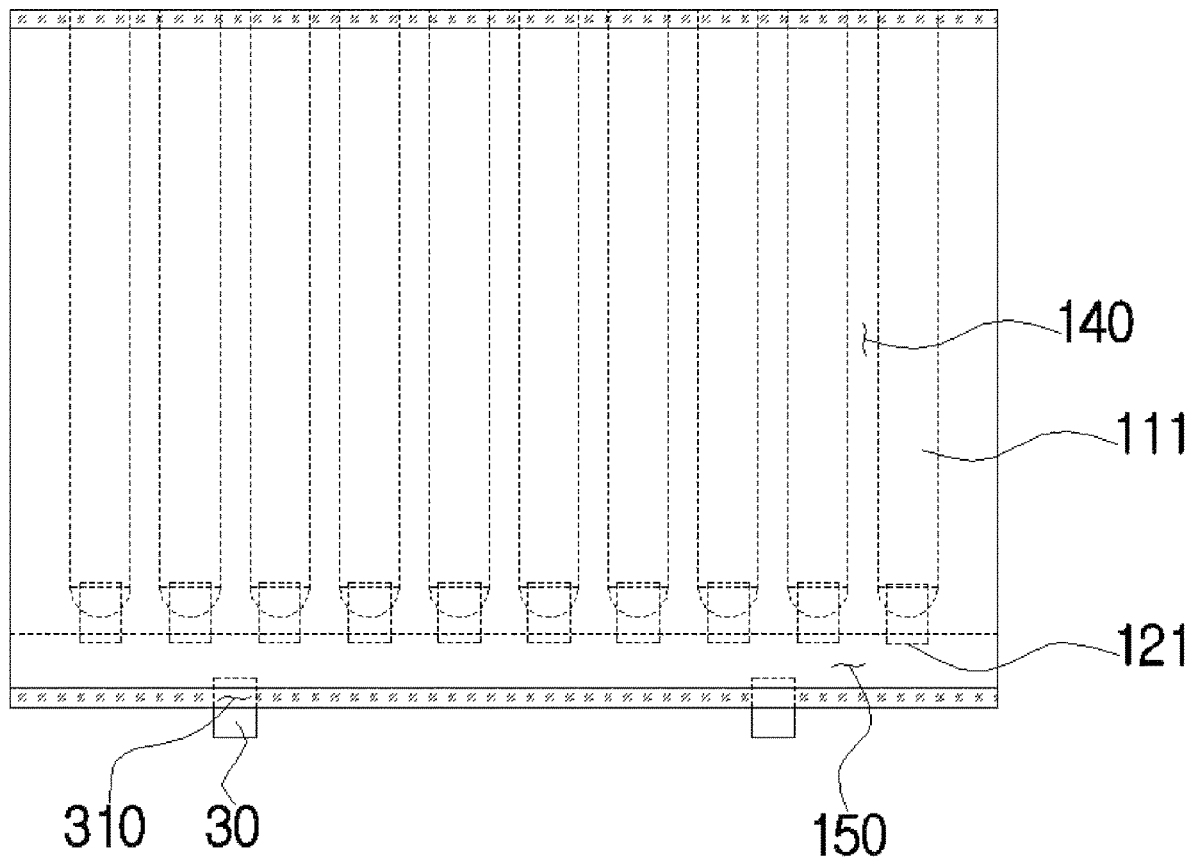
FIG. 14 is a plan view schematically showing a state in which the first end of the lower film and a first end the upper film are sealed.
Figure 15:
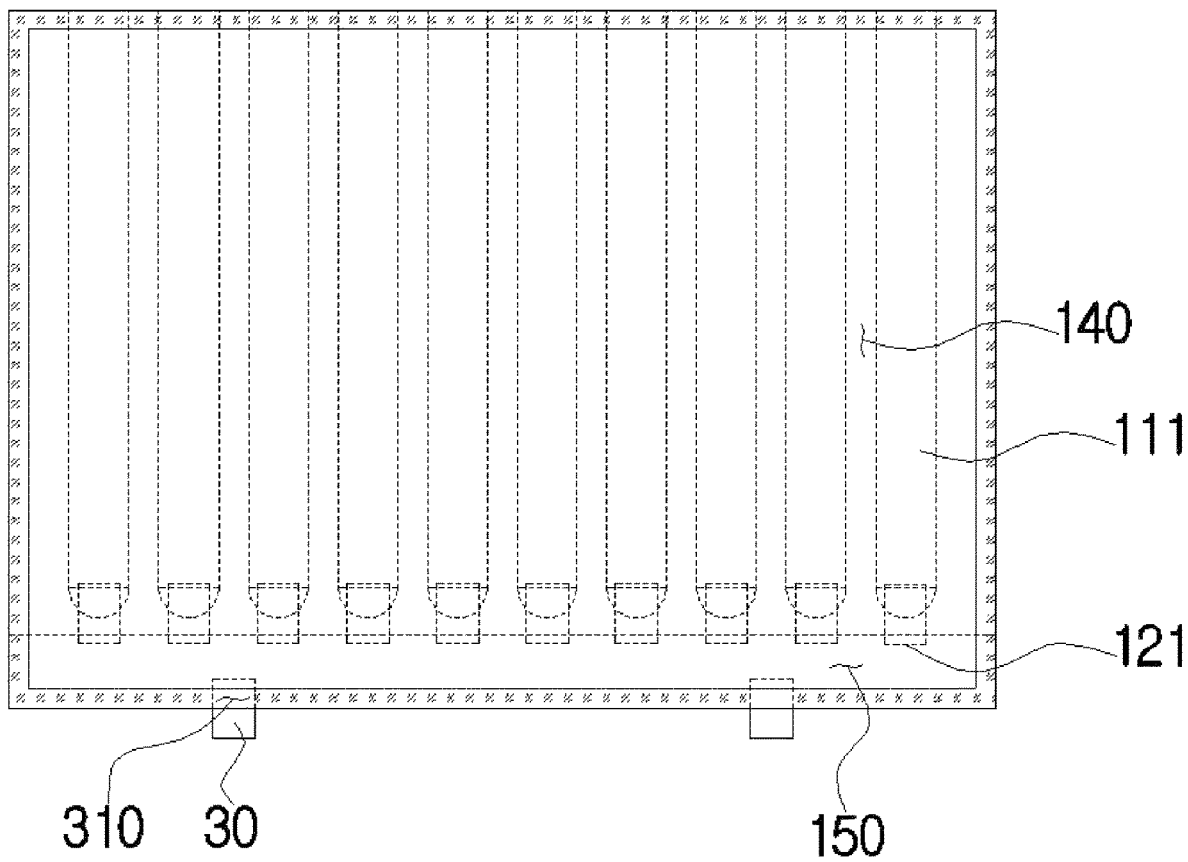
FIG. 15 is a plan view schematically showing a state in which front and rear ends of the lower film, front and rear ends of the formed film, and front and rear ends of the upper film are sealed.

FIG. 14 is a plan view schematically showing a state in which the first end of the lower film and a first end of the upper film are sealed. FIG. 15 is a plan view schematically showing a state in which front and rear ends of the lower film, front and rear ends of the formed film, and front and rear ends of the upper film are sealed.

Next, as shown in FIG. 14, there is further included a common injection space forming step (hereinafter, referred to as 'step e)') of forming an common injection space 150 that is in communication with the auxiliary check valves 121 by sealing the first end of the lower film 120 and the first end of the upper film 130, except for an injection hole 310 of each of the common check valves 30, by various methods such as adhering, welding, or the like.

The fluid such as air is injected into the common injection space 150 through the injection holes 310 of the common check valves 30 by using an injection means such as an injector. The fluid such as air injected into the common injection space 150 in the step e) is injected into the ridges 111 and into the spaces 140 formed between the ridges 111.

When the fluid such as air is injected into the ridges 111 through the multiple common check valves 30, adjacent ones of the ridges 111 are closed with the upper film 130 attached. This makes it possible to greatly increase cushioning and insulation of the cap packing sheet 10.

In particular, because the fluid such as air is injected into the spaces 140 formed between the ridges 111, heat exchange due to the spaces 140 is prevented, thus preventing insulation of the cap packing sheet 10 from being deteriorated with high efficiency.

As shown in FIG. 15, the front ends of the lower film 120, the formed film 110, and the upper film 130 are sealed by various methods such as adhering, welding, or the like. Furthermore, the rear ends of the lower film 120, the formed film 110, and the upper film 130 are sealed by various methods such as adhering, welding, or the like.

Figure 16:
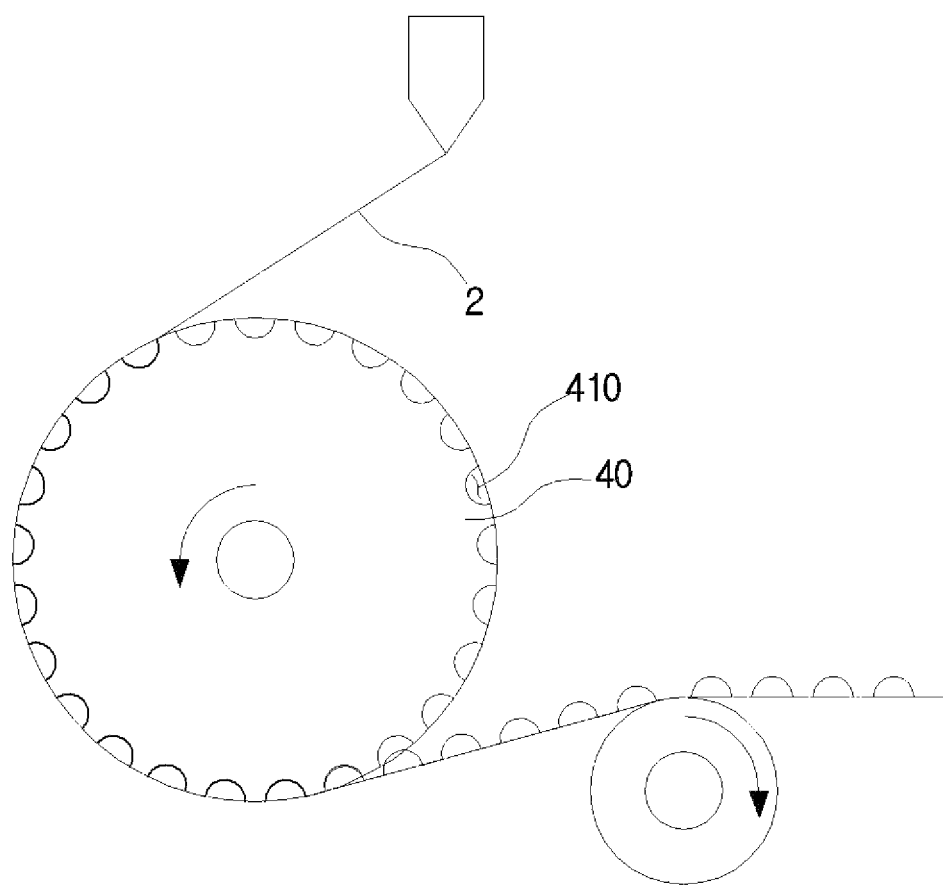
FIG. 16 is a side view schematically showing a process of producing the formed film by using a vacuum forming roller.

FIG. 16 is a side view schematically showing a process of producing the formed film by using a vacuum forming roller.

Next, a method of forming the ridges 111 on the formed film 110 may vary, for example, the vacuum forming roller 40 as shown in FIG. 16 is used.

The vacuum forming roller 40 has forming grooves 410 that are formed in an outer circumferential surface thereof at a regular interval and have a shape corresponding to the ridges 111. The formed film 110 is produced by melt-extruding a thermoplastic synthetic resin 2 onto the vacuum forming roller 40.

Figure 17:
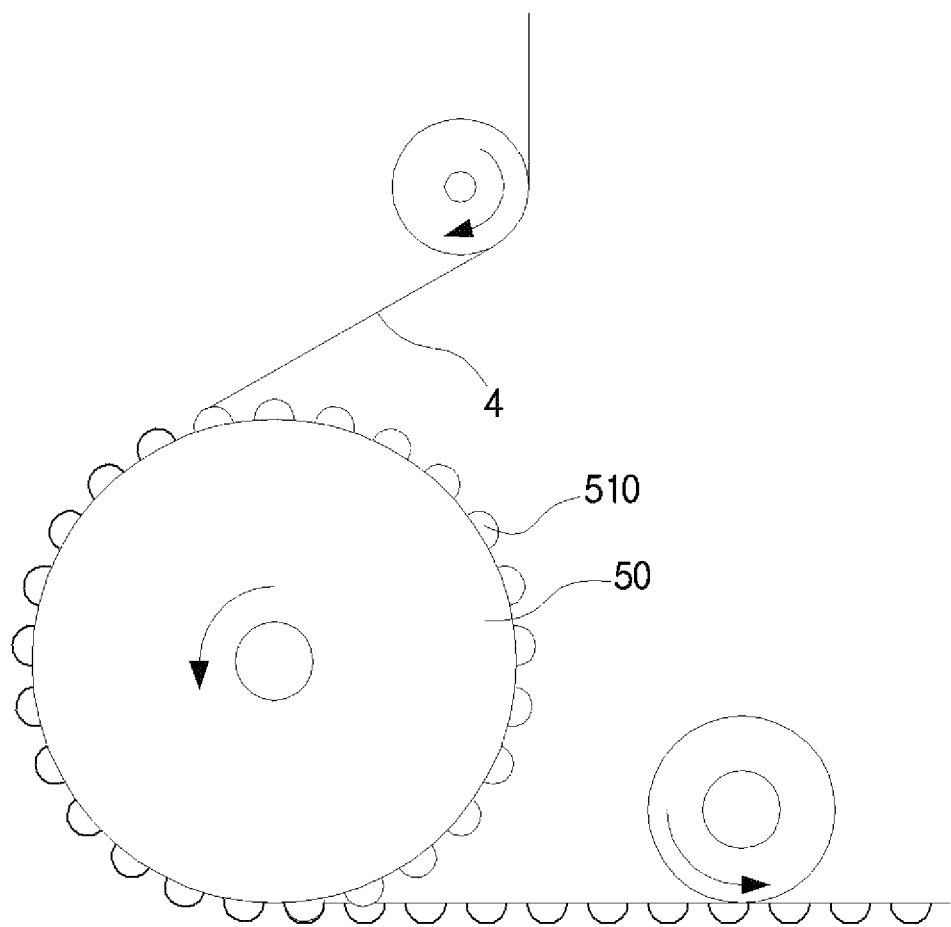
FIG. 17 is a side view schematically showing a process of producing the formed film by a thermoforming roller.

FIG. 17 is a side view schematically showing a process of producing the formed film by a thermoforming roller.

As another example, as shown in FIG. 17, the formed film 110 is produced by forming a thermoplastic synthetic resin film 4 by using the thermoforming roller 50 having forming protrusions 510 that protrude from an outer circumferential surface thereof at a regular interval and have a shape corresponding to the ridges 111.

Figure 18:
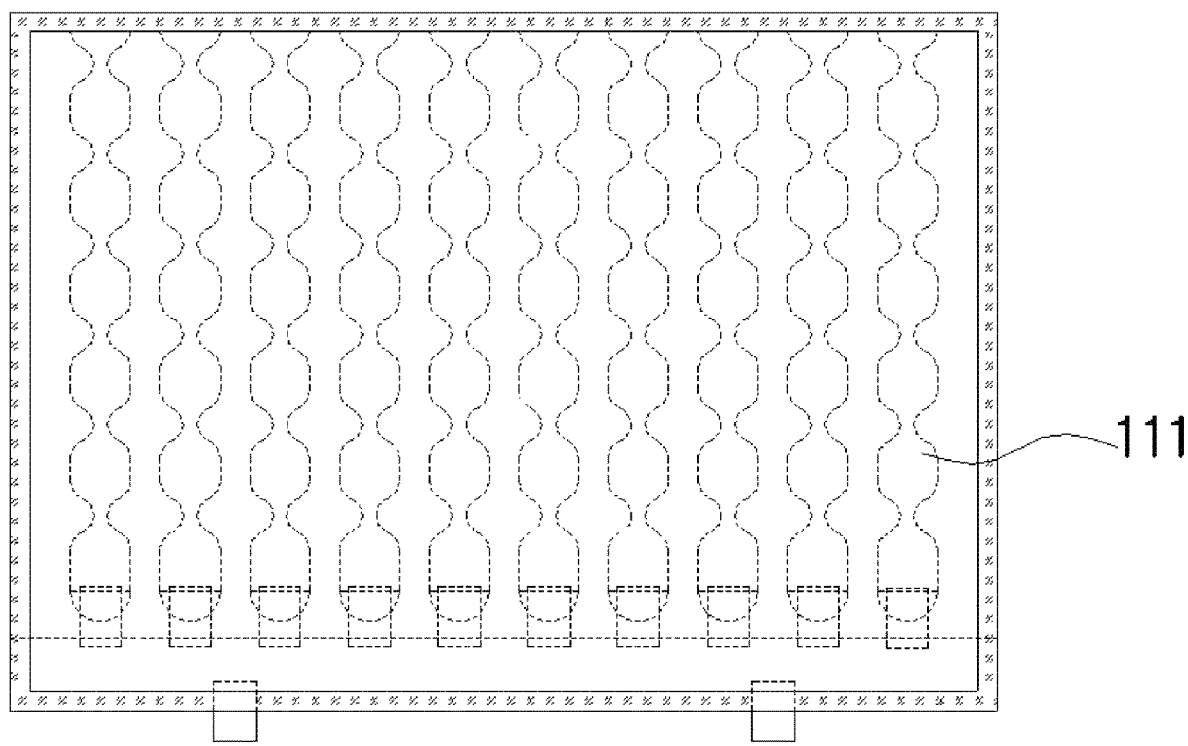
FIGS. 18 and 19 are views showing another shape of the cap packing sheet.
Figure 19:
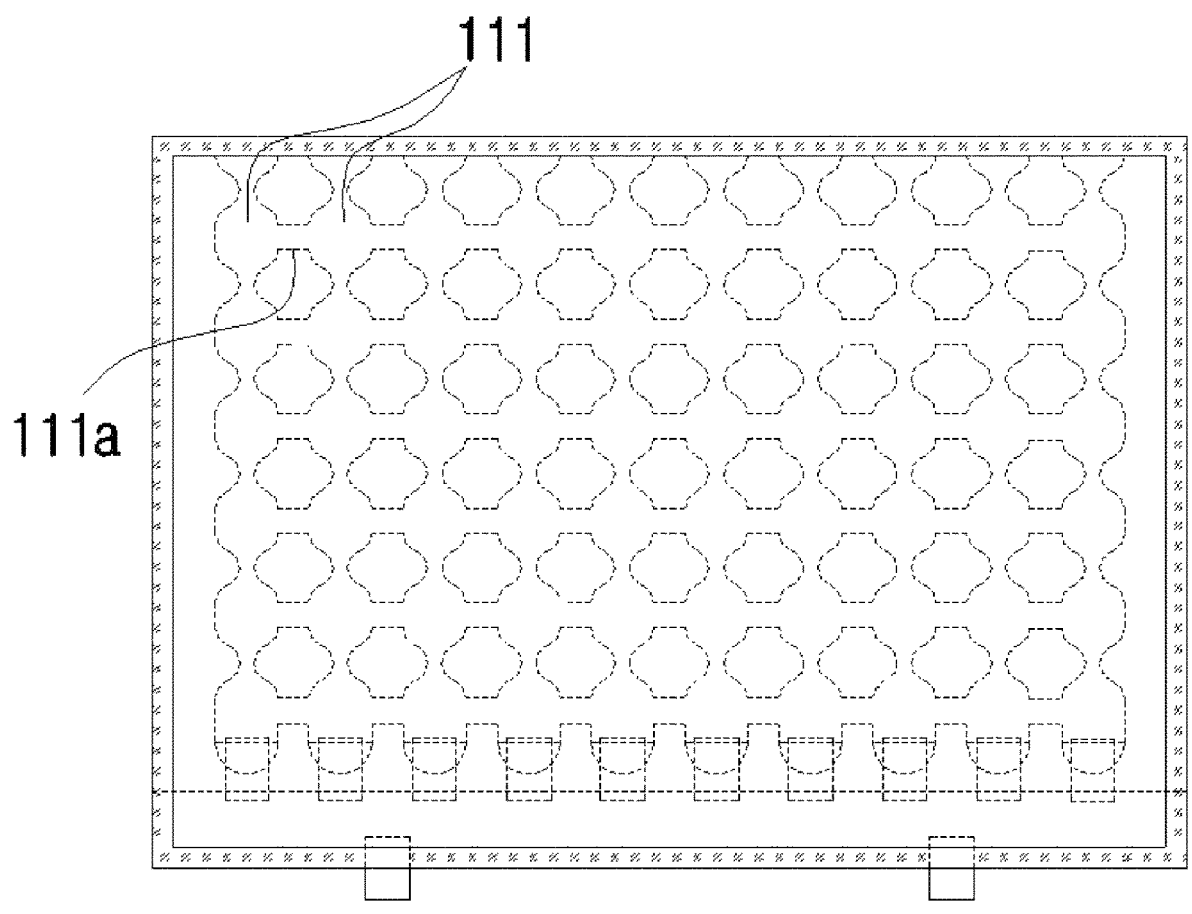

FIGS. 18 and 19 are views showing another shape of the cap packing sheet.

Next, as shown in FIG. 2, the ridges 111 of the cap packing sheet 10 have a "-" shape horizontally extending in a direction from a first side of the cap packing sheet 10 toward a second side thereof by a predetermined length, but the present invention is not limited thereto. The ridges may have various shapes, for example, as shown in FIG. 18, multiple ridges are arranged in an hourglass shape so as to communicate with each other in multiple rows.

Furthermore, as shown in FIG. 19, a connecting ridge 111a is provided between a ridge 111 of one row and a ridge 111 of an adjacent row and connects the ridge 111 of the one row and the ridge 111 of the adjacent row to each other, such that the connecting ridge communicates with the ridge 111 of the one row and the ridge 111 of the adjacent row.

As describe above, the connecting ridge 111a is provided between the ridge 111 of the one row and the ridge 111 of the adjacent row. However, in this case, when any one of the ridges 111 is damaged, a fluid in all the other ridges 111 as well as in the any one of the ridges 111 is liable to leak out of the cap packing sheet 10. Accordingly, it is preferable that the connecting ridge 111a is not provided.

Figure 20:
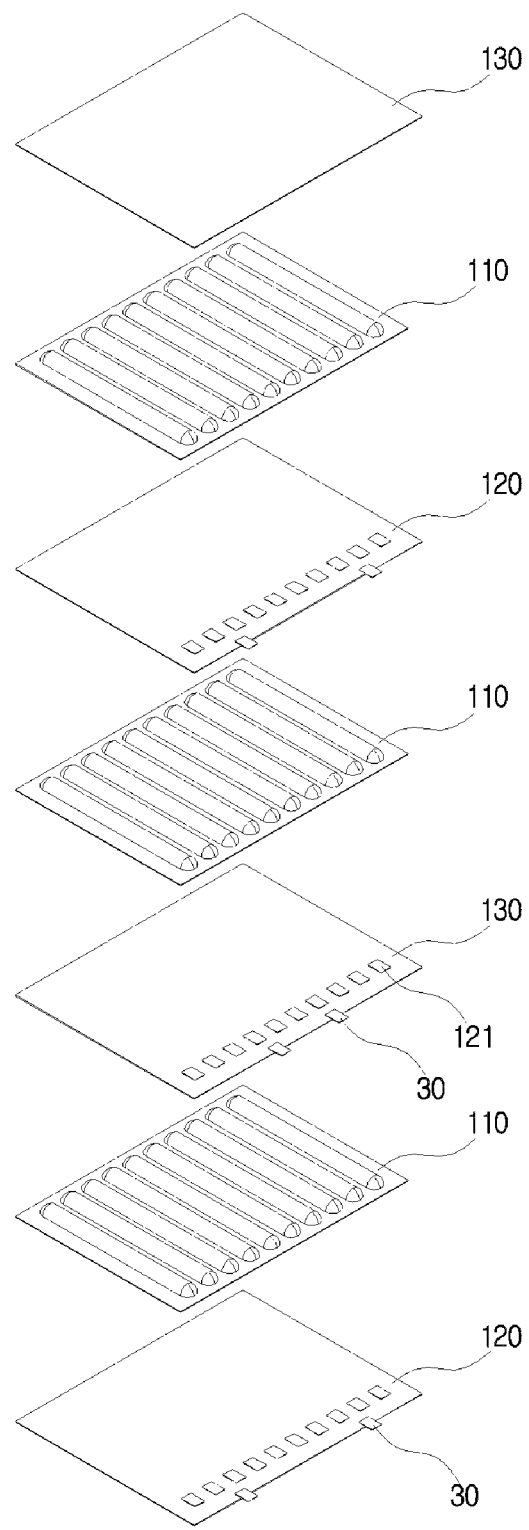
FIG. 20 is an exploded perspective view schematically showing multiple lower films, multiple formed films, and multiple upper films according to a second embodiment of the present invention.
Figure 21:
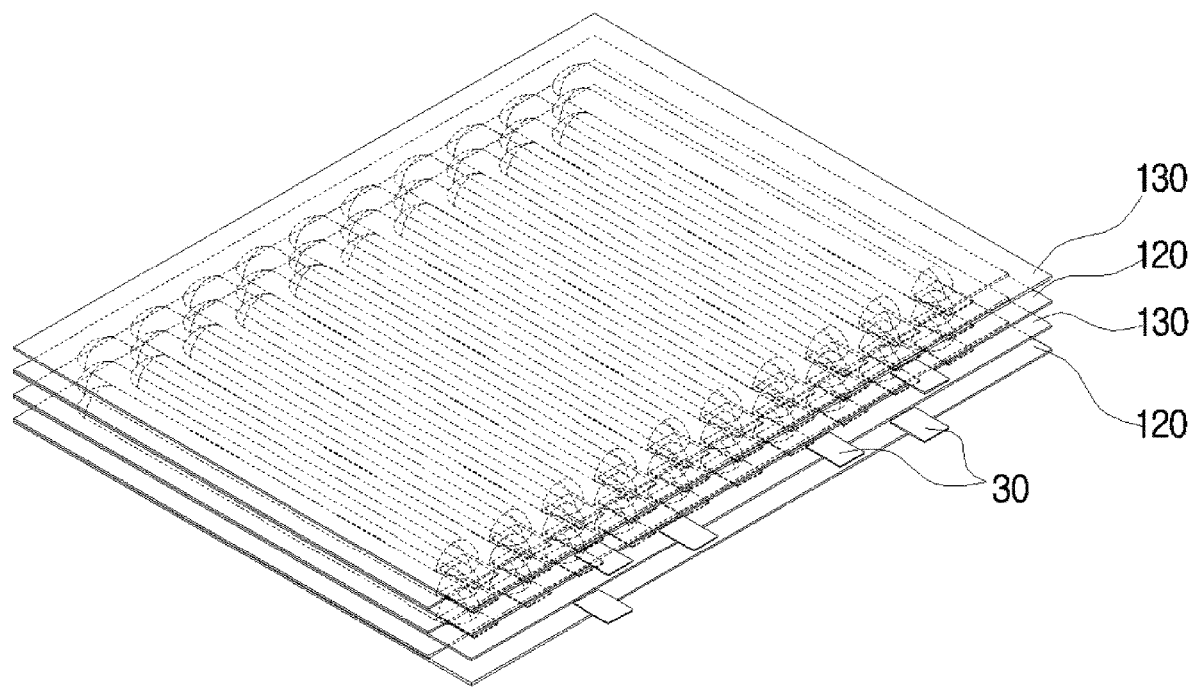
FIG. 21 is an assembled perspective view of FIG. 20.
Figure 22:
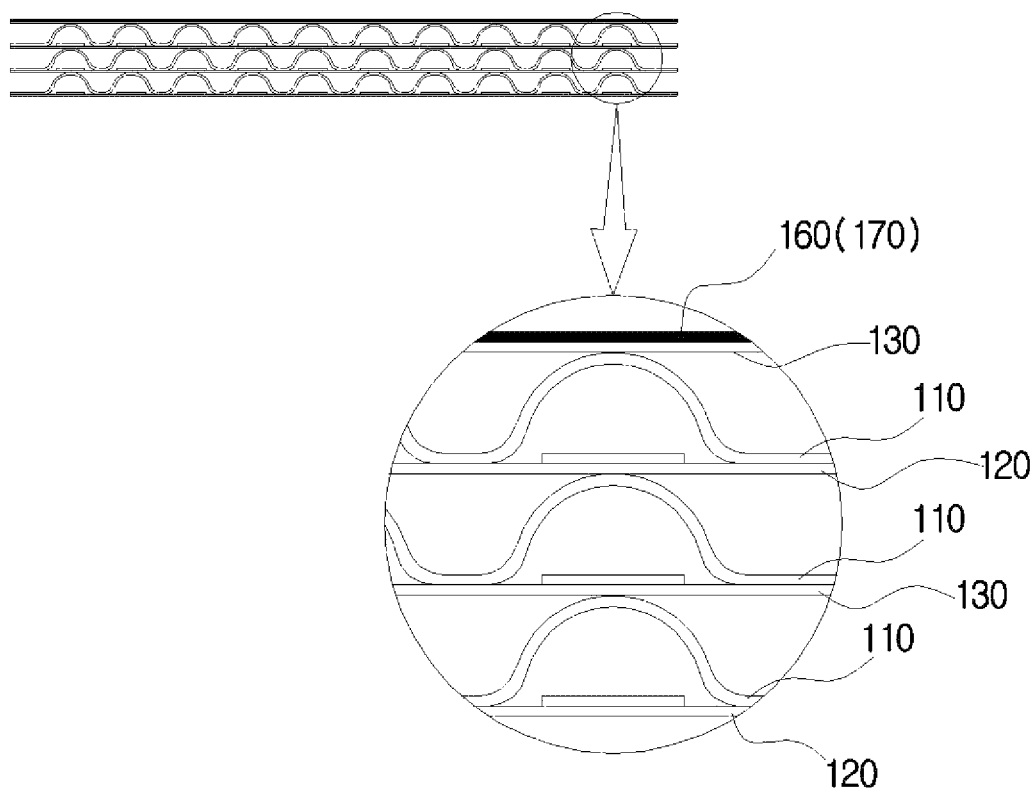
FIG. 22 is an assembled cross-sectional view of FIG. 20.
Figure 23:
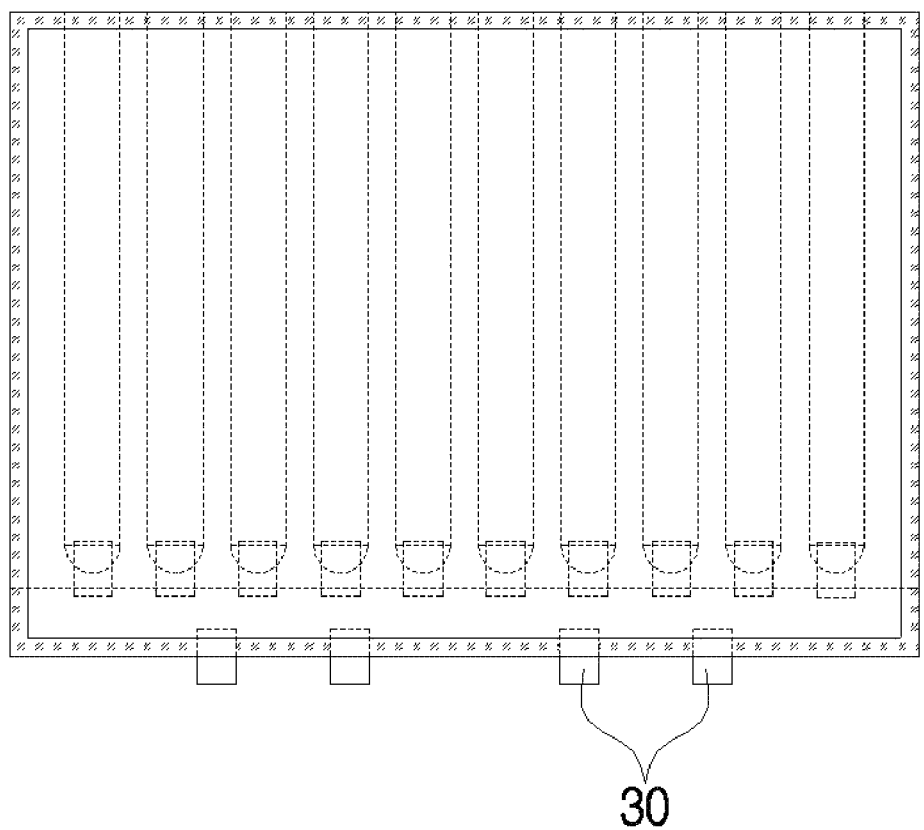
FIG. 23 is an assembled plan view of FIG. 20.

FIG. 20 is an exploded perspective view schematically showing multiple lower films, multiple formed films, and multiple upper films according to a second embodiment of the present invention, FIG. 21 is an assembled perspective view of FIG. 20, FIG. 22 is an assembled cross-sectional view of FIG. 20, and FIG. 23 is an assembled plan view of FIG. 20.

Next, a method for producing a packing sheet with improved insulation and storage properties according to a second embodiment of the present invention is configured in the same manner as that of the first embodiment except that as shown in FIGS. 20 to 23, the lower films 120, the upper films 130, and the formed film 110 are attached together in a state in which the lower films 120 and the upper films 130 are alternately stacked on top of each other with the formed films each interposed between the lower films and the upper films.

The auxiliary check valves 121 are provided at the side of the upper surface of each of the upper films 130 interposed between the formed films 110.

Furthermore, the common check valves 30 are provided on the upper surface of the first end of each of the lower films 120 and on an upper surface of the first end of each of the upper films 130.

Next, gas such as air is filled in all of the ridges 111 of the formed films 110 as described above, but the present invention is not limited thereto. Various gases may be filled in the ridges 111, such as an inert gas including nitrogen, argon, krypton, helium, neon, xenon, radon, and the like, which are not only excellent in insulation and but also stable and do not easily react.

Alternatively, various liquids such as water may be filled in all of the ridges 111 of the formed films 110.

Alternatively, in the second embodiment, air is injected into all of the ridges 111 of any one of the formed films 110, while the inert gas is filled in all of the ridges 111 of another one of the formed films 110, such that different gases are alternately filled in the ridges 111 of the formed films 110 arranged sequentially from the top to the bottom in one cap packing sheet 10.

Next, as shown in FIG. 7, a light reflection layer 160 is provided on an upper side of one upper film 130 of the first embodiment or on a lower side of one lower film 120 of the first embodiment. Alternatively, the light reflection layer 160 is provided both on the upper side of the one upper film 130 of the first embodiment and on the lower side of the one lower film 120 of the first embodiment. The light reflection layer is provided by various methods such as adhering, welding, or the like.

Furthermore, as shown in FIG. 22, the light reflection layer 160 is provided on the upper side of the upper film 130 located at the uppermost side of the cap packing sheet 10 of the second embodiment or on the lower side of the lower film 120 located at the lowermost side of the cap packing sheet 10 of the second embodiment. Alternatively, the light reflection layer 160 is provided both on the upper side of the upper film 130 located at the uppermost side of the cap packing sheet 10 of the second embodiment and on the lower side of the lower film 120 located at the lowermost side of the cap packing sheet 10 of the second embodiment. The light reflection layer is provided by various methods such as adhering, welding, or the like.

The light reflection layer 160 is provided for reflecting light radiated on the cap packing sheet 10, thus minimizing generation of heat at a high temperature on the surface of the light reflection layer 160 of the cap packing sheet 10 and may be made of various materials such as an aluminum foil.

Alternatively, in order to further improve insulation efficiency of the cap packing sheet 10, instead of the light reflection layer 160, a cover layer 170 composed of any one of a paper layer, a non-woven layer, and a woven layer is provided by various methods such as adhering, welding, or the like.

INDUSTRIAL APPLICABILITY

A packing sheet produced by a method for producing a packing sheet with improved insulation and storage properties according to the present invention can be transported and stored in a state in which air in ridges is removed, that is, the volume of the packing sheet is minimized, resulting in a significant reduction in logistics costs. Furthermore, when air is injected in to the ridges through multiple common check valves, adjacent ones of the ridges are closed with an upper film attached, making it possible to greatly increase cushioning and insulation of the packing sheet.

The invention claimed is:

1. A method for producing a packing sheet with improved insulation and storage properties, the method comprising:
producing a cap packing sheet comprised of a formed film on which convex ridges are formed at a regular interval in a direction from a front side to a rear side thereof and in which a fluid is injected into the ridges and into a space formed between each of the ridges, a lower film having auxiliary check valves provided at an upper surface thereof at a regular interval and being attached to a lower side of the formed film in a state in which each of the auxiliary check valves is disposed in a respective opening of a first end of each of the ridges of the formed film along a first edge of the cap packing sheet, thus sealing the ridges of the formed film, and an upper film attached onto the sealed ridges of the formed film;
cutting the cap packing sheet along a second edge thereof such that second ends of the sealed ridges of the cap packing sheet are opened;
passing the cut cap packing sheet which has been cut along the second edge thereof between a pair of rotary rollers so as to remove the fluid in the ridges of the cut cap packing sheet while compressing the cut cap packing sheet; and
winding the cut cap packing sheet on an outer surface of a winding roller.

2. The method of claim 1, wherein a first end of the lower film and a first end of the upper film extends longer than a first end of the formed film in a first side direction thereof, and
a common check valve is provided on an upper surface of the first end of the lower film or on a lower surface of the first end of the upper film.

3. The method of claim 2, wherein the common check valve comprises multiple common check valves that are provided on the upper surface of the first end of the lower film or on the lower surface of the first end of the upper film such that an interval between the common check valves is longer than an interval between the auxiliary check valves.

4. The method of claim 2, further comprising:
forming a common injection space that is in communication with the auxiliary check valves by sealing the first end of the lower film and the first end of the upper film, except for an injection hole of the common check valve.

5. The method of claim 1, wherein the formed film is produced by melt-extruding a thermoplastic synthetic resin onto a vacuum forming roller having forming grooves that are formed in an outer circumferential surface thereof at a regular interval and that have a shape corresponding to the ridges.

6. The method of claim 1, wherein the formed film is produced by forming a thermoplastic synthetic resin film by using a thermoforming roller having forming protrusions that are formed at a regular interval and that have a shape corresponding to the ridges.

7. The method of claim 1, wherein a plurality of each of the lower, upper, and formed films are provided, wherein the lower films, upper films, and formed films are attached together in a state in which the lower films and the upper films are alternately stacked on top of each other with the formed films each interposed between respective ones of the lower films and the upper films, and
auxiliary check valves are provided at a side of an upper surface of one of the upper films interposed between two of the formed films.

8. The method of claim 7, wherein a first end of each of the lower and upper films extends longer than a first end of each of the formed films in a first side direction thereof, and
a common check valve is provided on an upper surface of the first end of each of the lower films or on a lower surface of the first end of each of the upper films.

9. The method of claim 1, wherein the fluid is provided as gas filled in the ridges of the formed films.

10. The method of claim 9, wherein the gas is air or an inert gas.

11. The method of claim 1, wherein the fluid is provided as a liquid is filled in the ridges of the formed film.

12. The method of claim 11, wherein the liquid is water.

13. The method of claim 1, wherein a light reflection layer is provided on an upper side of the upper film or on a lower side of the lower film, or the light reflection layer is provided both on the upper side of the upper film and on the lower side of the lower film.

14. The method of claim 1, wherein a cover layer is provided on an upper side of the upper film or on a lower side of the lower film, or the light reflection layer is provided both on the upper side of the upper film and on the lower side of the lower film.

* * * * *